US008738163B2

(12) United States Patent
Robinson

(10) Patent No.: US 8,738,163 B2
(45) Date of Patent: May 27, 2014

(54) PROXY FILE POINTER METHOD FOR REDIRECTING ACCESS FOR INCOMPATIBLE FILE FORMATS

(75) Inventor: Robert S. Robinson, Trenton, NJ (US)

(73) Assignee: Channel D Corporation, Trenton, NJ (US)

( * ) Notice: Subject to any disclaimer, the term of this patent is extended or adjusted under 35 U.S.C. 154(b) by 326 days.

(21) Appl. No.: 13/165,460

(22) Filed: Jun. 21, 2011

(65) Prior Publication Data

US 2012/0165965 A1 Jun. 28, 2012

Related U.S. Application Data

(60) Provisional application No. 61/427,520, filed on Dec. 28, 2010.

(51) Int. Cl.
*G06F 17/00* (2006.01)

(52) U.S. Cl.
USPC .................................... 700/94; 707/E17.009

(58) Field of Classification Search
USPC .......... 707/795, 706, 825; 715/716, 723, 202; 705/14; 700/94
See application file for complete search history.

(56) References Cited

U.S. PATENT DOCUMENTS

2002/0048450 A1* 4/2002 Zetts .............................. 386/95
2002/0138641 A1 9/2002 Taylor et al.
2005/0262172 A1 11/2005 Gold et al.
2007/0288638 A1 12/2007 Vuong et al.
2008/0025507 A1* 1/2008 Taylor .......................... 380/201
2009/0282076 A1* 11/2009 Werstiuk et al. ........... 707/104.1

OTHER PUBLICATIONS

International Search Report of PCT Application No. PCT/US2011/41259 dated Oct. 18, 2011, 2 pages.

* cited by examiner

*Primary Examiner* — Fan Tsang
*Assistant Examiner* — David Siegel
(74) *Attorney, Agent, or Firm* — Lowenstein Sandler LLP

(57) ABSTRACT

A media file playback system, method and computer readable medium which provides for the playback of a media file (e.g., audio files, video files, etc.) through a separate media organizer (e.g., Apple's iTunes®, Windows® Media Player, etc.) when the target media file is in a format that is incompatible with the media organizer (e.g., the Free Audio Lossless Codec files or FLAC format). The media file playback system generates a "proxy" pointer file that is compatible with the media organizer and prompts the system to play the incompatible media file. Advantageously, a user that would otherwise be unable to playback an incompatible file through the media organizer due to limitations of the media organizer (e.g., the restriction against playing FLAC files through the Apple iTunes® software application), is able to execute playback using the media file playback system via interactions with the familiar and centralized interface provided the media organizer.

17 Claims, 9 Drawing Sheets

Fig. 6

| Name | Size | Kind |
|---|---|---|
| Paul McCartney | -- | Folder |
| Uncompressed Band on the Run H | -- | Folder |
| 18~Zoo Gang.flac | 44.7 MB | FLAC Audio File |
| 17~Band.flac | 46.9 MB | FLAC Audio File |
| 16~Nineteen Hundred and Eighty.flac | 130.1 MB | FLAC Audio File |
| 15~Band on the Run from One Ha.flac | 119.7 MB | FLAC Audio File |
| 14~Let Me Roll It from One Han.flac | 98.7 MB | FLAC Audio File |
| 13~Jet from One Hand Clapping.flac | 91.9 MB | FLAC Audio File |
| 12~Bluebird from One Hand Clap.flac | 75.5 MB | FLAC Audio File |
| 11~Country Dreamer.flac | 66 MB | FLAC Audio File |
| 10~Helen Wheels.flac | 83 MB | FLAC Audio File |
| 9~Nineteen Hundred and Eighty .flac | 123.2 MB | FLAC Audio File |
| 8~Picassos Last Words Drink to.flac | 125.4 MB | FLAC Audio File |
| 7~No Words.flac | 55.1 MB | FLAC Audio File |
| 6~Mamunia.flac | 104.6 MB | FLAC Audio File |
| 5~Let Me Roll It.flac | 106 MB | FLAC Audio File |
| 4~Mrs Vandebilt.flac | 102.9 MB | FLAC Audio File |
| 3~Bluebird.flac | 72.5 MB | FLAC Audio File |
| 2~Jet.flac | 91.9 MB | FLAC Audio File |
| 1~Band on the Run.flac | 113.4 MB | FLAC Audio File |

| Name | Time | Bit Rate | Sample Rate | Track # | Disc # | Artist | Album |
|---|---|---|---|---|---|---|---|
| Band on the Run | 5:18 | 6 kbps | 96.000 kHz | 1 of 18 | 1 | Paul McCartney / Wings | Band on the Run /Hi-Res Digital Download (Unlimited) |
| Jet | 4:13 | 6 kbps | 96.000 kHz | 2 of 18 | 1 | Paul McCartney / Wings | Band on the Run /Hi-Res Digital Download (Unlimited) |
| Bluebird | 3:30 | 6 kbps | 96.000 kHz | 3 of 18 | 1 | Paul McCartney / Wings | Band on the Run /Hi-Res Digital Download (Unlimited) |
| Mrs Vandebilt | 4:46 | 6 kbps | 96.000 kHz | 4 of 18 | 1 | Paul McCartney / Wings | Band on the Run /Hi-Res Digital Download (Unlimited) |
| Let Me Roll It | 4:54 | 6 kbps | 96.000 kHz | 5 of 18 | 1 | Paul McCartney / Wings | Band on the Run /Hi-Res Digital Download (Unlimited) |
| Mamunia | 4:54 | 6 kbps | 96.000 kHz | 6 of 18 | 1 | Paul McCartney / Wings | Band on the Run /Hi-Res Digital Download (Unlimited) |
| No Words | 2:38 | 6 kbps | 96.000 kHz | 7 of 18 | 1 | Paul McCartney / Wings | Band on the Run /Hi-Res Digital Download (Unlimited) |
| Picasso's Last Words (Drink to Me) | 5:55 | 6 kbps | 96.000 kHz | 8 of 18 | 1 | Paul McCartney / Wings | Band on the Run /Hi-Res Digital Download (Unlimited) |
| Nineteen Hundred and Eighty Five | 5:32 | 5 kbps | 96.000 kHz | 9 of 18 | 1 | Paul McCartney / Wings | Band on the Run /Hi-Res Digital Download (Unlimited) |
| Helen Wheels | 3:52 | 6 kbps | 96.000 kHz | 1 of 18 | 2 | Paul McCartney / Wings | Band on the Run /Hi-Res Digital Download (Unlimited) |
| Country Dreamer | 3:10 | 5 kbps | 96.000 kHz | 2 of 18 | 2 | Paul McCartney / Wings | Band on the Run /Hi-Res Digital Download (Unlimited) |
| Bluebird (from One Hand Clapping) | 3:30 | 6 kbps | 96.000 kHz | 3 of 18 | 2 | Paul McCartney / Wings | Band on the Run /Hi-Res Digital Download (Unlimited) |
| Jet (from One Hand Clapping) | 4:02 | 6 kbps | 96.000 kHz | 4 of 18 | 2 | Paul McCartney / Wings | Band on the Run /Hi-Res Digital Download (Unlimited) |
| Let Me Roll It (from One Hand Clapping) | 4:27 | 6 kbps | 96.000 kHz | 5 of 18 | 2 | Paul McCartney / Wings | Band on the Run /Hi-Res Digital Download (Unlimited) |
| Band on the Run (from One Hand Clapping) | 5:19 | 6 kbps | 96.000 kHz | 6 of 18 | 2 | Paul McCartney / Wings | Band on the Run /Hi-Res Digital Download (Unlimited) |
| Nineteen Hundred and Eighty Five (from One Hand Clapping) | 6:05 | 6 kbps | 96.000 kHz | 7 of 18 | 2 | Paul McCartney / Wings | Band on the Run /Hi-Res Digital Download (Unlimited) |
| Country Dreamer (from One Hand Clapping) | 2:20 | 6 kbps | 96.000 kHz | 8 of 18 | 2 | Paul McCartney / Wings | Band on the Run /Hi-Res Digital Download (Unlimited) |
| Zoo Gang | 2:02 | 6 kbps | 96.000 kHz | 9 of 18 | 2 | Paul McCartney / Wings | Band on the Run /Hi-Res Digital Download (Unlimited) |

PROXY FILE POINTER METHOD FOR REDIRECTING ACCESS FOR INCOMPATIBLE FILE FORMATS

CROSS-REFERENCE TO RELATED APPLICATION

This application claims the benefit of U.S. Provisional Application No. 61/427,520, titled "Proxy File Pointer Method for Redirecting Access for Incompatible File Formats", filed on Dec. 28, 2010. U.S. Provisional Application No. 61/427,520 is hereby incorporated by reference herein.

FIELD OF THE INVENTION

The present invention relates generally to a computer-based media playback method and system which use hard drives or other storage devices (e.g., solid state storage) for storing media files. Such systems use dedicated software (e.g., Apple's ITUNES®, WINDOWS® Media Player) to access the media files. In the case of media file that contain audio (an "audio file"), the dedicated software converts digital information stored in the audio file to an analog format which can then be amplified and heard through loud speakers or headphones.

BACKGROUND OF THE INVENTION

Many file formats exist for storing media files. Popular media play-back software such as Apple Inc.'s ITUNES® and WINDOWS® Media Player can recognize and decode many of the most common file formats. For example, uncompressed digital audio files can be stored in the "WAVE" file format which can be read and decoded by ITUNES® and WINDOWS® Media Player. Since they are uncompressed, WAVE files take up a great deal of space on a computer's storage media. The MP3 file is another popular file format that allows for compressed digital audio files which occupy less space on a computer's storage media. However, one drawback of compressed audio file formats such as MP3 is that resulting sound quality is compromised.

A number of "lossless" compressed audio file formats have emerged to address the audio degradation problems commonly associated with other compressed file formats such as MP3 and WMA. One such lossless file format is FLAC, which stands for Free Lossless Audio Codec. FLAC is likely the most widely used file format for digital storage and distribution of high quality audio, and is used extensively by commercial music download services selling high resolution music (24 bit, 88.2 kHz or higher sample rate). However, wider use of the FLAC file format is limited by the fact that Apple's ITUNES® (one of the most popular digital media players available) is not capable of decoding FLAC files to allow playback. ITUNES® inability to play FLAC files may be due to the fact that Apple offers a competing lossless file format called "Apple Lossless."

Current methods of circumventing ITUNES'® inability to play FLAC involve converting the audio file to other file formats that ITUNES® can recognize. These methods are disadvantageous because the file conversion represents a significant inconvenience to the user, and requires significant extra storage space (if the original is archived).

Therefore a need exists in the art for playing and integrating incompatible media file types (such as FLAC files) with commercially available media playback software that offers ease of use.

SUMMARY OF THE INVENTION

The present application describes embodiments of a media file playback system, method and computer readable medium (herein the "media playback system") which provides for the playback (or execution) of a media file (e.g., audio files, video files, etc.) through a separate media organizer (e.g., Apple's ITUNES® and WINDOWS® Media Player) when the desired/target media file is in a format that is incompatible with the media organizer (e.g., the Free Audio Lossless Codec files or FLAC format). Advantageously, the media player of the present invention is configured to allow a user to utilize the familiar interface of an existing (but limited) media organizer to execute the playback of a media file which is otherwise incompatible with the media organizer.

According to embodiments of the present invention, the media player of the present invention is configured to generate and utilize a "proxy" pointer file that is compatible with the media organizer and the media playback system and automatically prompts the media playback system to play the media file that is incompatible with the media organizer (herein the "incompatible file"). In this regard, a user that would otherwise be unable to playback an incompatible file through the media organizer due to limitations of the media organizer (e.g., the restriction against playing Free Audio Lossless Codec (FLAC) files through the Apple ITUNES® software application), is able to execute that playback using the media playback software via interactions through the familiar and centralized interface provided the media organizer. Although embodiments of the present invention are described with a focus primarily on a system and method for playing FLAC or other media format files in conjunction with Apple's ITUNES® software application, one of ordinary skill in the art will recognize that the media playback system disclosed herein is suitable for use with a variety of media files (e.g., audio, video) and a variety of media organizers like Apple ITUNES®.

The media playback system is a computer-based system comprising hard drives or other storage devices (e.g., solid state storage) for storing the media files. The media playback system is configured to utilize separate, dedicated software (e.g., Apple's ITUNES®, WINDOWS® Media Player) to access the media files. In the case of a media files that contain audio (an "audio file"), the media playback system converts digital information stored in the audio file to an analog format which can then be amplified and heard through loud speakers or headphones.

The media playback system overcomes the current problems associated with using FLAC files (or other incompatible media file formats) in popular software for playing digital files. According to an embodiment of the present invention, the media playback system represents a stand-alone media player application configured to communicate or link with Apple's ITUNES® via a high level communication protocol known as AppleScript. The media playback system is capable of decoding and playing FLAC files (or other incompatible file formats). A proxy file is generated that is compatible with the media organizer (i.e., ITUNES®) and contains information related to the digital media (e.g., music) contained in the media file (e.g., artist, album, song name, audio or media file format, duration), herein referred to as "proxy file information"). The media organizer (ITUNES®) recognizes the proxy file as a compatible file format and builds the proxy file into the media organizer's database which allows a user to view and interact with the media file in his or her media organizer library (e.g., the ITUNES® music library). When a user instructs the media organizer to play/execute the proxy file by interacting with the associated listing in the ITUNES® library (the "track listing"), the media playback system detects this action and is configured to play the desired media file.

Embodiments of the present invention advantageously leverage the computer user's familiarity with the highly popular ITUNES® user interface, instead of needing to learn to use another music player software package. In this regard, ITUNES® acts as a database, playlist organizer, etc. but does not actually play the media file. Features of the media playback system can then can be customized to appeal to specialized market segments, to include features not included (and not likely to ever be included) in the ITUNES® software, such as automatic sample rate switching, memory play, electronic crossover, audio signal processing plug-ins, dithered volume control, and high resolution streaming audio, by way of example and not limitation.

BRIEF DESCRIPTION OF THE DRAWINGS

The present invention will be more readily understood from the detailed description of exemplary embodiments presented below considered in conjunction with the attached drawings, of which:

FIG. 6 illustrates an exemplary library of incompatible media files, according to one or more embodiments of the present invention;

FIG. 8 illustrates a listing of generated proxy files corresponding to associated incompatible media files; according to embodiments of the present invention; and FIG. 9 illustrates exemplary proxy files organized and displayed in a media organizer, according to embodiments of the present invention.

It is to be understood that the attached drawings are for purposes of illustrating the concepts of the invention and may not be to scale.

DETAILED DESCRIPTION OF THE INVENTION

The present invention relates to a media playback system and method (the "Media Playback System") for playing a digital media file ("media file") using a first application (the "Media Organizer"), wherein the media file cannot be played by the media organizer due to file format incompatibility (the "incompatible file"). The Media Playback System is configured to generate a separate proxy file or group of files ("proxy file(s)") based on the underlying incompatible media file. The proxy file is compatible with the Media Organizer and can be incorporated into the Media Organizer's database. The proxy file is associated with the incompatible file and contains proxy file information about the underlying media file. The proxy file information may include, but is not limited to, a duration of the content (e.g., song and/or video), a title of the content, artist/publisher/author information, album/movie/clip information (for example, in the case of the media file being an audio music track), etc.

Figure 1:
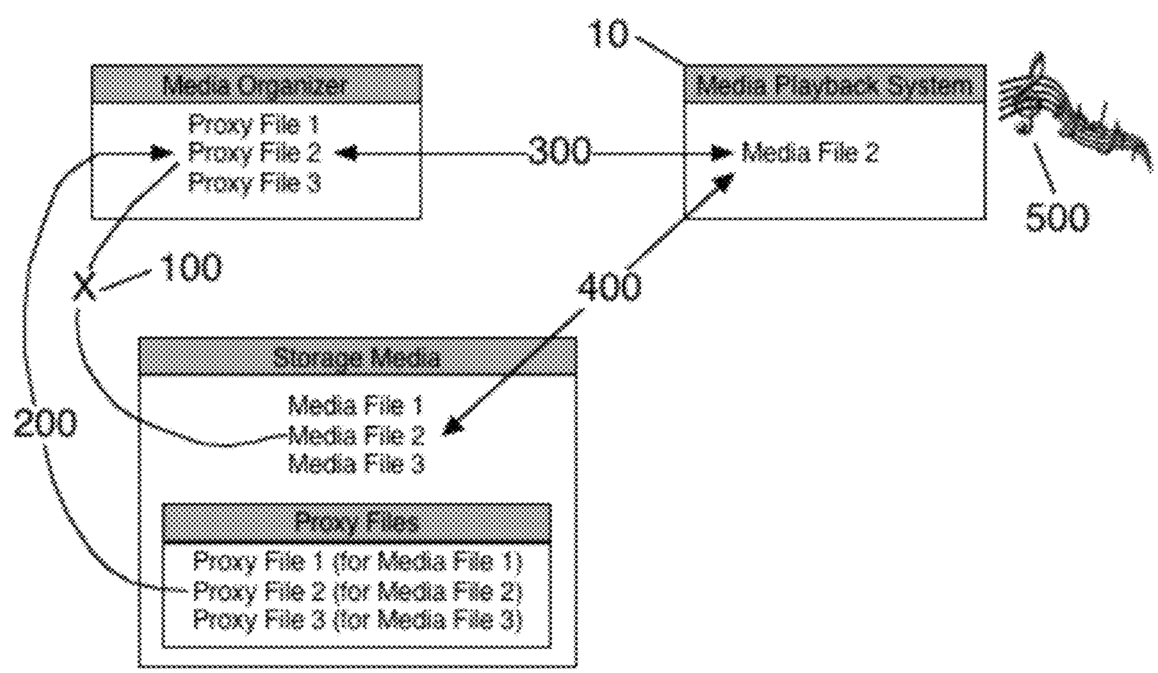
FIG. 1 illustrates a schematic and process flow diagram comprising a media playback system in an exemplary operating environment comprising a media organizer and storage media, according to embodiments of the present invention.

According to an embodiment of the present invention, as shown in FIG. 1, the Media Playback System 10 comprises computer executable instructions executed and processed by one or more computer modules or computers. The Media Playback System 10 and its components are configured to perform the various functions, actions, and steps described in detail herein, according to embodiments of the present invention. As used herein, the term "computer module" or "computer" is intended to include any data processing device, such as a desktop computer, a laptop computer, a mainframe computer, a personal digital assistant, a server, or any other device able to process, manage or transmit data, whether implemented with electrical, magnetic, optical, biological components or otherwise. One having ordinary skill in the art will appreciate that any number of computers and/or software modules may be utilized in implementing the media playback system according to the present invention.

According to embodiments of the present invention, the media playback system may be implemented using a computer including memory resources coupled to a processor via a bus. The memory resource can include, but is not limited to, random access memory (RAM), read only memory (ROM), and/or other storage media capable of storing computer executable instructions, e.g., program instructions, that can be executed by the processor to perform various embodiments of the present disclosure. The memory resource instructions may store computer executable instructions either permanently or temporarily.

As used herein, the term "software" or "computer executable instructions" refers to instructions that may be performed by a processor and/or other suitable components. The term "storage media" can includes various storage media that can be used to store computer executable instructions. Storage media can include non-volatile media and/or volatile media, among other types of media and can be in the form of magnetic media, optical media, and/or physical media, among others. Some examples include hard disks, floppy disks, CD ROMs, DVDs, and Flash memory. Embodiments of the present disclosure are not limited to a particular type of storage media.

According to embodiments of the present invention, the one or more computers may be coupled to a display. The display can be a liquid crystal display (LCD) monitor or a cathode ray tube (CRT), or any other display type capable of displaying information to a user.

According to embodiments of the present invention, the one or more computers may be coupled to one or more input devices, including, but not limited to a keyboard, voice activated system, touch screen system, and/or mouse, among various other input devices.

According to embodiments of the present invention, the one or more computers include a communication interface configured to provide data communication coupling between the one or more computers and any communicatively connected components, such as a network, other computing devices, e.g., client and/or server devices, storage media, and the like. As used herein, the term communicatively connected is intended to include any type of connection, whether wired or wireless, in which data may be communicated. Furthermore, the term "communicatively connected" is intended to include a connection between devices and/or programs within a single computer or between devices and/or programs on separate computers. As a non-limiting example, the communication interface can be an integrated services digital network (ISDN) card or a modem used to provide a data communication connection to a corresponding type of telephone line. The communication interface can also be a LAN card used to provide a data communication connection to a compatible LAN. The interface can also be a wireless link used to send and receive various types of information.

Although specific embodiments have been illustrated and described herein, those of ordinary skill in the art will appreciate that an arrangement configured to achieve the same results can be substituted for the specific embodiments shown. This disclosure is intended to cover adaptations or variations of various embodiments of the present disclosure. It is to be understood that the above description has been made in an illustrative fashion, and not a restrictive one. Combinations of the described embodiments, and other embodiments not specifically described herein will be apparent to those of skill in the art upon reviewing the description below.

According to an embodiment of the present invention, the proxy file does not contain the original digital program content (e.g., the actual music and/or video) but instead comprises a silent or null data block (i.e., silence in the case of an audio file or a blank video block in the case of video media), or a compressed, low fidelity version of the original (i.e., a compressed data block).

The Media Organizer is configured to open and execute (play) the proxy file generated by the Media Playback System 10 since the proxy file is in a format that is compatible with the Media Organizer. According to an embodiment of the present invention, when a user directs the Media Organizer to play the proxy file via an interaction (e.g., clicking on the selected file name) with the proxy file via a library/interface associated with the Media Organizer, the Media Playback System 10 polls the Media Organizer for state information including, but not limited to, the proxy file information. The Media Playback System 10 also optionally may direct the Media Organizer to stop playing the file at this time, or later. Based on information obtained from the Media Organizer, the Media Playback System 10 determines whether the file being played by the Media Organizer is a proxy file. The Media Playback System 10 can also determine where the proxy file and associated media file are physically located, which could be the local computer hard drive or on a remote network. For example, this could be determined by the relative position of proxy file and media file in a file organization hierarchy, which may or may not be predetermined by the design of the Media Playback System 10, or through location information such as a file path, directory reference or URL or other type of tag information embedded in or associated with (such as in a separate "sidecar" or other catalog file) the proxy file. Once the Media Playback System 10 determines that the Media Organizer is executing a proxy file, the Media Playback System 10 directly opens and plays the media file associated with the selected proxy file thus allowing the user to access the program content contained in the original media file (which is compatible with the media file).

According to an embodiment of the present invention and referring to FIG. 1, a Media File (in the illustrated example, an audio file such as a FLAC file denoted as "Media File 2") that is incompatible with the Media Organizer is loaded into the Media Playback System 10. According to one or more embodiments of the present invention, the Media Playback System 10 is configured to recognize and play file formats compatible with the Media Organizer, as well as incompatible formats by incorporating a corresponding proxy file into the Media Organizer. The Media Playback System 10 loads all media files for playback using similar techniques, regardless of the format (i.e., whether directed by the Media Organizer to a compatible format or directed by the Media Organizer to a proxy file). The Media Playback System 10 recognizes the file being played back and loads the original media file. One having ordinary skill in the art will appreciate that "loading" the file may include, but is not limited to, generating an operating system file reference number through standard programming interface system calls and opening the file for reading or writing as needed, or proceeding further and physically loading portions of or the entire file into random access memory for playback, for which the audio is streamed or transmitted to an audio interface or digital to analog converter.

In the illustrated example, Media File 2 is not compatible with the player associated with the Media Organizer and thus the Media Organizer cannot directly execute, play, and/or read Media File 2. Moreover, the Media Files referred to in FIG. 1 are incompatible with the Media Organizer and cannot be loaded directly into the Media Organizer library (i.e., track list/database).

Figure 2:
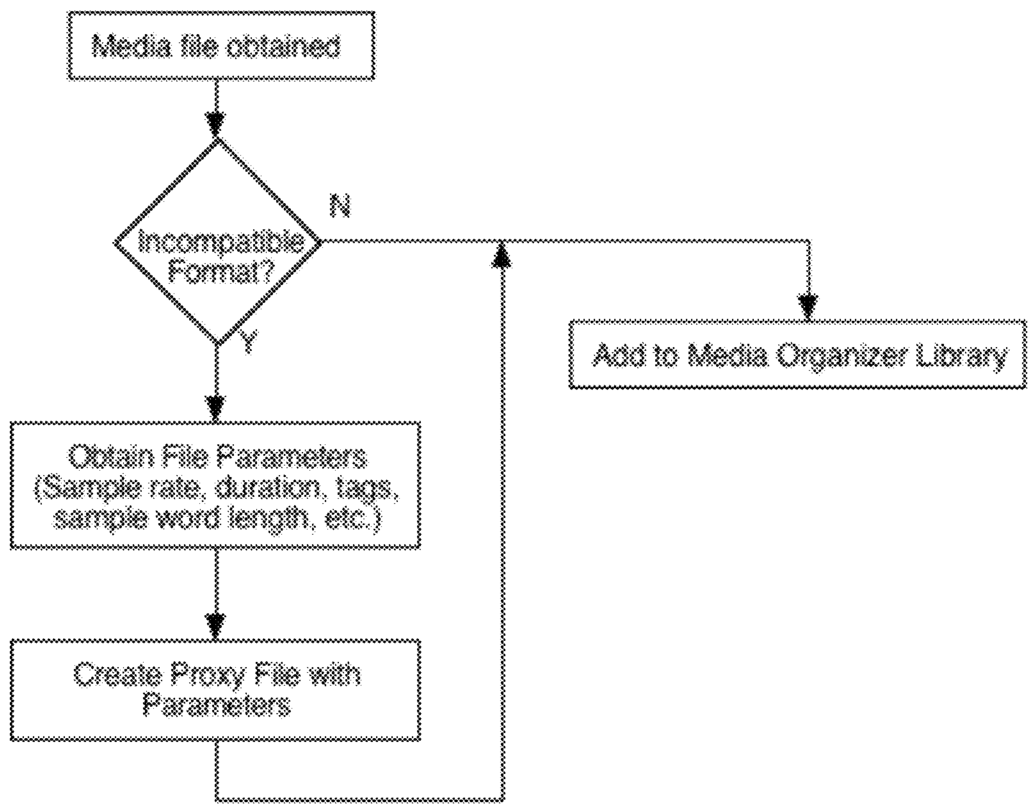
FIG. 2 illustrates an exemplary process flow for generating a proxy file, according to one or more embodiments of the present invention.

According to an embodiment of the present invention, with reference to FIG. 2, Media Files are examined by the Media Playback System 10, which determines if these files are in a format incompatible with the Media Organizer.

The Media Playback System 10 creates a proxy file (e.g., Proxy File 1, Proxy File 2, Proxy File 3 shown in FIG. 1) based on the information obtained from parsing the Media File. According to an embodiment of the present invention, the parsing may be performed by incorporating software routines that recognize the file format of the media file based on file extension or contents of the file. For example, after determining the file is a DSD format file, such files contain a standardized header from which information about sample rate, media duration and other characteristics needed to construct the proxy file can be obtained. The proxy file is created in a format recognizable (i.e., compatible) with the Media Organizer, and accordingly, the proxy file is added to the Media Organizer library (shown as the "Storage Media" in FIGS. 1 and 3) by the Media Playback System 10—designated by a entry in the Storage Media which corresponds to the proxy file. To the user, the proxy file is indistinguishable (or nearly indistinguishable) from the original media file, apart from the physical location of the original media file, and the data bit rate (which, as a highly compressed file containing silence or a highly compressed version of the original audio, is a fraction of that of the original). The characteristics, format and make-up of the proxy file (collectively referred to as the "proxy file information") according to embodiments of the present invention are described in detail below. According to an embodiment of the present invention, the proxy file information may include, but is not limited to, a proxy file directory location and name, proxy file tags or silence within the proxy file. One having ordinary skill in the art will appreciate that the creation of the proxy file may be performed by a separate application/program communicatively connected to the Media Playback System 10. According to an embodiment of the present invention, a data bit rate of the proxy file is substantially less than that of a data bit rate of the media file. For example, according to an embodiment of the present invention, the data bit rate of the proxy file may be less than 10 percent of the data bit rate of the media file.

According to an embodiment of the present invention and referring to FIG. 2, after downloading or otherwise obtaining a FLAC file (or other incompatible Media File(s)), the user directs the Media Playback System 10 to attempt to open the particular Media File via interaction with a user interface associated with the Media Playback System 10. The Media Playback System 10 determines if the selected one or more Media Files are of a format incompatible with the Media Organizer. This and the following functions of the present invention also could be incorporated into a separate application designed only to create the proxy files, but for convenience to the user this function is incorporated into the Media Playback System 10.

According to an embodiment of the present invention, the Media Playback System 10 scans a communicatively connected storage media to locate a proxy file that corresponds to the selected media file (i.e., the media file the user wishes to play). If no such proxy file is located, the Media Playback System 10 creates a corresponding proxy file in a format that is compatible with the Media Organizer. One exemplary method of creating the proxy file involves the Media Playback System 10 determining media file information comprising parameters associated with the original media file, such as, for example, a sample rate, sample word length and file duration, and tag information (i.e., any embedded information "tags" such as artist and album information). The resulting proxy file has the same parameters as the original Media File (although since the audio data in the proxy file comprises silence or a silent data block or a highly compressed data block, a duplication of the sample word length format is unnecessary). In addition, the resulting proxy file may have varying degrees of compression based on the selected file format. For example, the data bit rate of the proxy file may be approximately 10% of the data bit rate of the corresponding media file. The newly created proxy file is recognizable by the Media Organizer and can be loaded into the Media Organizer's library, which advantageously represents the library that is typically used most frequently by the user.

According to an embodiment of the present invention, the process of adding the proxy file to the Media Organizer can be automated. This may be done, for example, via high level communication protocols (such as AppleScript) to command the Media Organizer to incorporate proxy files into its database or library. One having ordinary skill in the art will recognize that a variety of existing software applications (such as third party software or those incorporated in the computer's operating system) can be utilized. In addition, according to an embodiment of the present invention, the process depicted in FIG. 2 may be automated by employing a system to monitor when new media files are created, and when a new media file is detected of an incompatible type. For example a "watch" folder can be monitored by the Media Playback System 10 and if used as the destination for media file downloads, the Media Playback System 10 may automatically create new proxy files and add them to the Media Organizer when the Media Playback System 10 detects the presence of any newly added media files in the watch folder.

According to embodiments of the present invention, as noted above, the proxy file is generated in a file format recognizable by the Media Organizer. Therefore, with reference to the example shown in FIG. 1, the Media Organizer is able to recognize and load Media File 2 because the corresponding Proxy File 2 is in a format that is compatible with Media Organizer. Referring again to FIG. 1, the original media file (e.g., Media File 2) cannot be loaded into the Media Organizer because the file is in an incompatible format, as illustrated in step 100. Accordingly, in step 200, the Media Organizer database/library catalog entry for Proxy File 2 is displayed or presented to the user by Media Organizer, and refers to Proxy File 2. Next, in step 300, the Media Playback System 10 polls the Media Organizer (step 300) to obtain the proxy file information associated with the currently selected track. According to an embodiment of the present invention, the polling process may involve the Media Organizer actually playing the proxy file for a short period of time. According to an embodiment of the present invention, the polling step uses high level system calls between the Media Organizer and the Media Player 20, and may occur frequently (e.g., numerous times per second). Based on the proxy file information obtained from the Media Organizer, the Media Playback System 10 recognizes the file as a proxy file, locates the underlying Media File (which is in a format compatible with the Media Playback System 10), and decodes and plays the Media File.

In the example shown in FIG. 1, the Media Playback System 10 locates Media File 2 which is associated with Proxy File 2, in step 400, and provides the identified media file to the Media Playback System 10. The Media Playback System 10 can then play Media File 2, in step 500. Therefore, the Media Organizer acts as the vehicle to "load" the media file based on the corresponding proxy file (in step 200) while the Media Playback System 10 plays the actual media file (in steps 400 and 500). The described arrangement avoids the disadvantage of needing a significant amount of duplicate storage space for converting the incompatible file (e.g., a FLAC file) into another format and storing the converted file, because the proxy file is only a very small fraction of the size of the original media file.

According to embodiments of the present invention, the proxy file acts as a pointer to the original media file containing the original digital asset(s). The proxy file contains all or a subset of the same information contained in the media file except the actual digital content (music, video, etc.). Based on the proxy file information contained in and extracted from the proxy file, the Media Playback System 10 is able to locate the physical media file for playback. The format of the proxy file is chosen as one compatible with the Media Organizer, so the Media Organizer is able to load it. Many different file formats may be used for this purpose, including without limitation, Direct Stream Digital (DSD) (e.g., .dff extension files or .dsf extension files), M4A, MP3, WMA, AAC (as indicated by file extension used for identification by software). By way of example and not limitation, the proxy file can also contain all of the identification information and "tags" present in the original Media File, for the benefit of Media Organizer, which can display this information. The Media Organizer is able to load the information contained in the proxy file into the Media Organizer library or track list, which then appear as regular (i.e., accessible) media files or tracks to the user. The Media Organizer provides a convenient way for a user to quickly view and sort the music library and view information about albums and artists.

According to an embodiment of the present invention, the proxy file also contains a digital media track of the same length (duration) and sample format (sample rate) as the original Media File, but includes a silent data block (i.e., zeroes). According to an alternative embodiment of the present invention, the content of the proxy file also may contain a highly compressed, low fidelity version of the original digital media. As far as the Media Organizer is concerned, the proxy file contains the same content as the original, incompatible media file, except that actual playback results in silence or null output (e.g., a blank screen in the case of video; or, as in the case of an alternative embodiment, a low-fidelity version of the original). The reason the proxy file contains silence is because such files can be compressed very efficiently, thereby reducing the storage size of the proxy file to a very small fraction (less than one hundredth) of the size of the original Media File. The presence of the silent data block or highly compressed data block (e.g., highly compressed audio or video) also is necessary to cause the file to appear the same (in terms of playback duration) as the actual Media File to the Media Organizer.

In an alternative embodiment of the invention, suitably formatted proxy files could be distributed along with or separately from the Media Files, either by download or including, without limitation, to physical disk, memory stick, flash memory or other media. Such proxy files would be substantially similar or identical to the proxy files created by the Media Playback System 10. One exemplary incentive for doing this would be one of user convenience. Instead of the user having to use the Media Playback System 10 to create the proxy files, the user may simply open the proxy files in the Media Organizer, thereby adding them to its library or playlist. The proxy files, by virtue of their relative physical location to the Media Files (or via embedded location tags), would automatically point to the Media Files, directing the Media Playback System 10 in locating them.

According to an embodiment of the present invention, the proxy files may, as described above, point to Media Files located on (and including, without limitation) a remote storage device accessible via a network. Further, the Media Organizer may be designed to automatically recognize such proxy files, using them for locating the actual Media Files, without having to actually load the Media Files themselves in its library or playlist. Here, instead of silence, a highly compressed version of the content in the Media Files could be incorporated in the proxy files, for low fidelity playback or preview of the content of the original Media Files, should the latter be temporarily inaccessible (for example, if the network where the Media Files were located was disconnected or otherwise unavailable).

One having ordinary skill in the art will recognize that the proxy file format can be chosen from a wide variety of file formats employing various degrees of compression, such as, for example, Apple Lossless, AAC, MP3, 3GP. The Media Playback System 10 then queries the Media Organizer for information about the selected Media Track. The Media Tracks appear to the Media Organizer to be essentially identical to the originals as far as tag information, sample rate and duration are concerned. This information also facilitates the Media Playback System 10 in reserving the necessary amount of memory and performing other steps required in preparation for playing the file. The steps taken in preparation would essentially be identical to those required for the original Media File. In fact, the only operation that would be different for the Media Player 20 compared to playing Media Files without resorting to the proxy method is that instead of loading the proxy file, the original Media File is loaded into and played by the Media Player 20 (steps 400 and 500 in FIG. 1). The proxy file also could contain optional information, including without limitation, track fade information, volume adjustment level, track grouping, track order, equalization settings.

Other types of "alias" pointer files are unable to overcome the problems addressed by embodiments of the present invention because they simply "point" to the physical location of the incompatible file type and are not recognized as compatible file types by Media Organizer (because they are resolved by the computer operating system as being exactly the same file as the original). Therefore, the proxy files used according to various embodiments of the present invention overcome this problem by being fully compatible with the Media Organizer.

FIG. 1 shows a possible arrangement and relationship between the original incompatible media files (labeled Media Files 1-3) and the proxy format files. Here, the Proxy Files are located in a subdirectory located hierarchically one level below the original Media Files (labeled Proxy Files 1-3). The Media Playback System 10 can then efficiently locate the original Media Files based on directory relationship. According to an embodiment of the present invention, the proxy files and the original Media Files have identical file names except for the file format extension required by the computer operating system.

The proxy files may be located anywhere on the computer file storage system or network, provided that the Media Playback System 10 is able in some way to determine the relationships between the physical locations of the original Media Files (e.g., Media Files 1-3) and the proxy files (e.g., Proxy Files 1-3). For example, instead of being located in a subdirectory as depicted in FIG. 1, the proxy files could be located in a separate directory and organized in a way (such as located in appropriately named subdirectories) enabling the Media Playback System 10 to locate the original Media Files.

Figure 3:
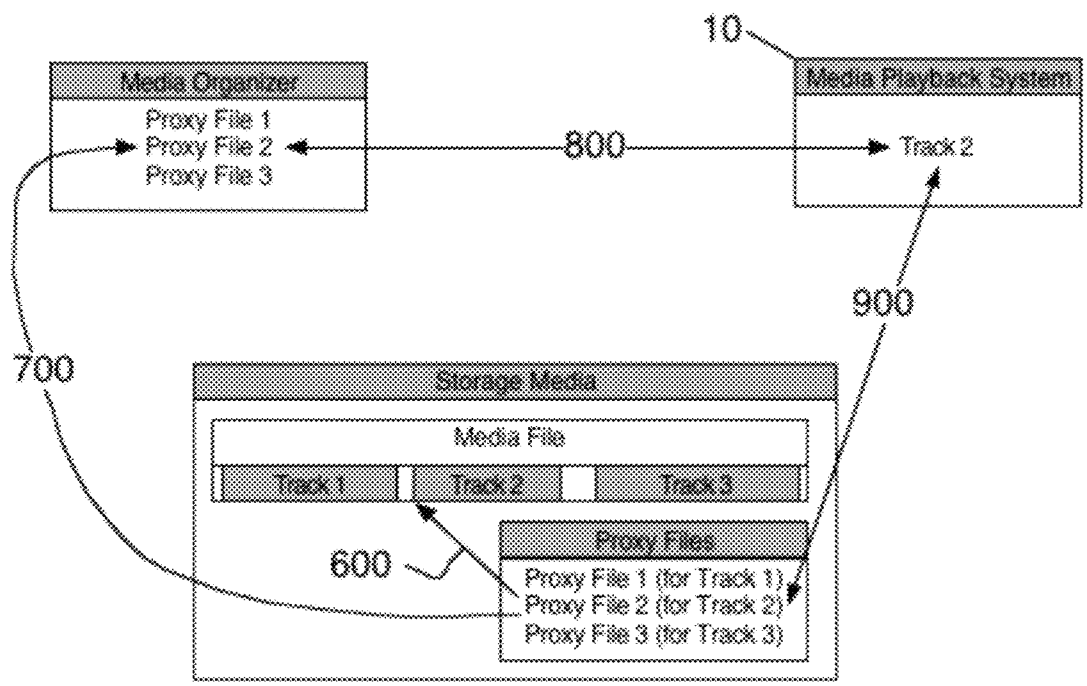
FIG. 3 illustrates a schematic and process flow diagram comprising a media playback system configured to generate a plurality of proxy files, each associated with an individual track of a media file, according to one or more embodiments of the present invention.

According to an embodiment of the present invention and referring to FIG. 3, the proxy files can act as indices or pointers delineating subsets or individual tracks contained within a single Media File. This is particularly useful when, for example, a particular musical composition is presented as one larger continuous recording as in the case of an orchestral recording. While one proxy file could contain information about the larger recording, other proxy files can be created which refer to discrete segments of the larger recording. For example, Track 2 of the Media File, as illustrated in FIG. 3, could be delineated by a time offset from the beginning of the larger recording. As in other embodiments of the present invention, the Media Playback System 10 obtains information concerning Track 2's location within the Media File by querying the Media Organizer, as described herein. By querying the Media Organizer and reading Track 2's corresponding proxy file (i.e., Proxy File 2), the Media Playback System 10 can determine that Track 2 refers to a segment of the larger Media File. The Media Playback System 10 can then use tag or pointer information stored in Track 2's corresponding proxy file (Proxy File 2) to determine the time offset and allow the user to jump directly to the musical segment of Media File Track 2.

Figure 4:
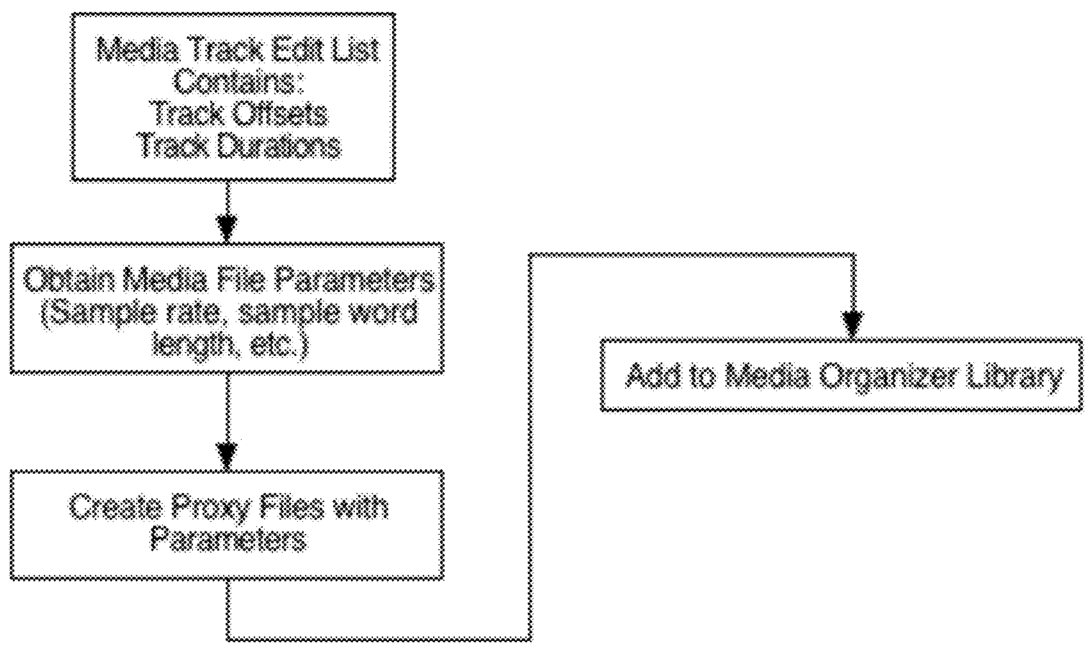
FIG. 4 illustrates an exemplary process flow for generating a plurality of proxy files, each associated with an individual track of a media file, according to embodiments of the present invention.

According to an embodiment of the present invention and referring to FIG. 4, a Media Track Edit List which contains the offsets and durations (as well as other information, including without limitation, track fade information, volume playback level, track order, equalization settings) is used in conjunction with the format (such as sample rate, resolution or word length) of the original Media File to create proxy files pointing to the tracks in the Media File. Similar to that shown in FIG. 2, the proxy files are then added to the Media Organizer software library where they are made accessible to the user.

According to an embodiment of the present invention, instead of containing silence or blank video (for example), the proxy file could contain a highly-compressed version or short portion of the digital content from the original Media File.

Advantageously, the Proxy File could be used as a "guide" file that could be played directly by the Media Organizer but at a reduced fidelity level (which would permit using a large amount of file compression). In such a case, "lossy" compression as well as word length reduction could be used, since the goal is to create a guide file where efficiency of compression is of primary importance and fidelity of low importance.

Figure 5:
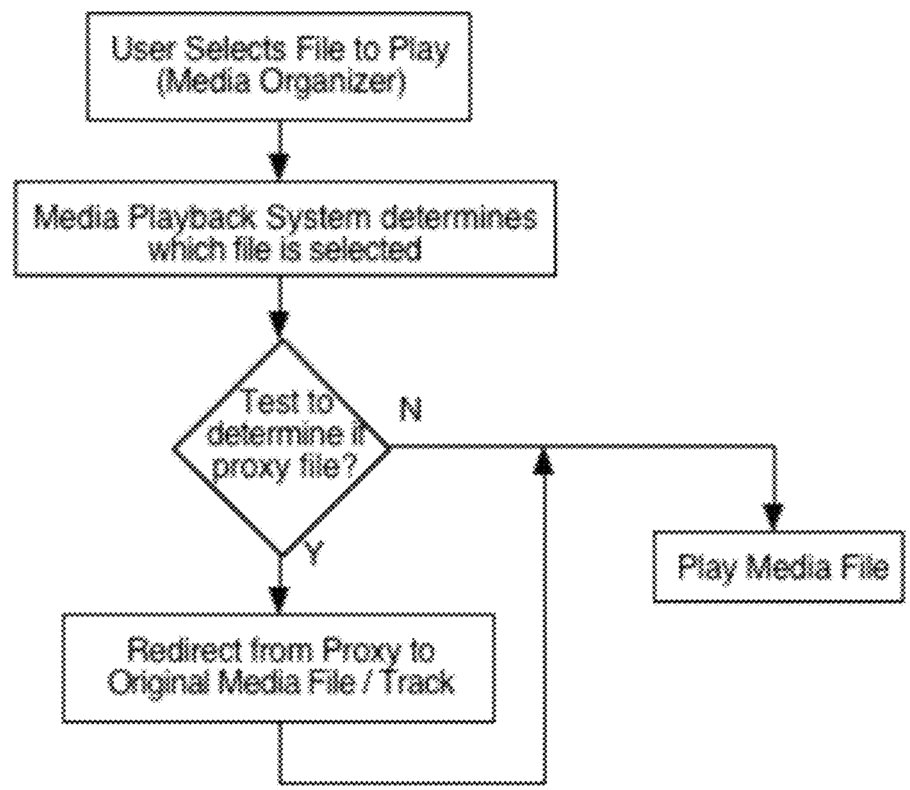
FIG. 5 illustrates an exemplary process flow illustrating operation of a media playback system in response to a user interaction with a media organizer to execute playback of a media file, according to embodiments of the present invention.
Figure 7:
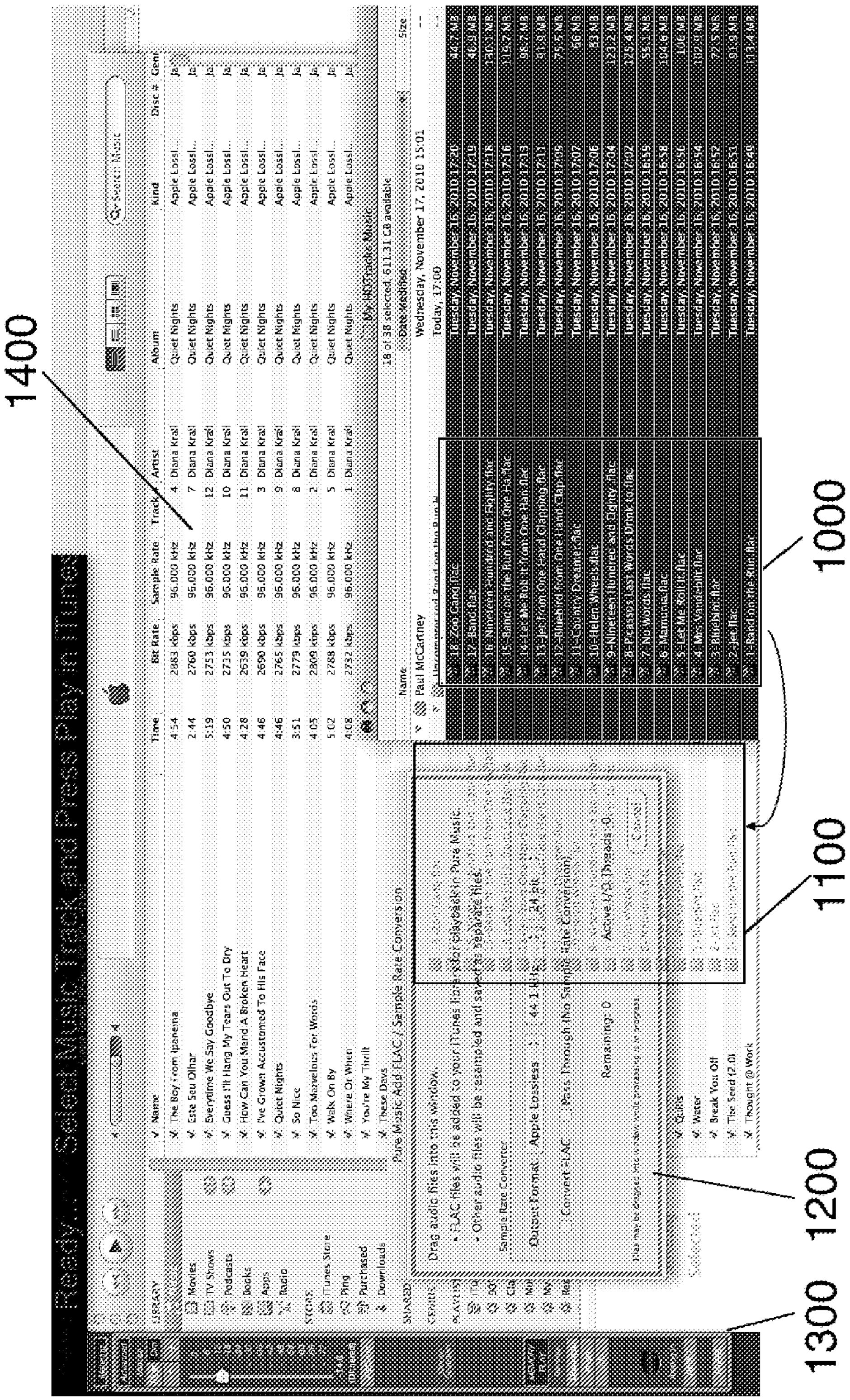
FIG. 7 illustrates an example wherein a user interacts with a media organizer and a proxy creation window to initiate the incorporation of one or more incompatible media files into the media organizer as one or more proxy files, according to one or more embodiments of the present invention.

According to an embodiment of the invention and referring to FIGS. 1, 3 and 5, a user selects a media file to play within the Media Organizer via a standard interaction (e.g., clicking on a track listing). In response, the Media Organizer automatically begins playing the corresponding proxy file. The Media Playback System 10 queries the Media Organizer and is able to determine that a proxy file is being opened by the Media Organizer. The determination of whether a proxy file is being played is made based on information gathered during polling state information of the Media Organizer, such as directory information for the proxy file and silent output from the proxy file. If the Media Playback System 10 determines that a proxy file is being played, the Media Playback System 10 automatically resolves the physical location of the incompatible file type (or primary Media File and its associated Track) represented by the proxy file. The Media Playback System 10 then directly decodes and plays the original Media File (or portion thereof). If the file opened by the Media Organizer is not a proxy file, the user has the option of playing the Media File in either the Media Organizer or the Media Playback System 10 based on individual preference.

An illustration of an embodiment of the invention is shown in FIGS. 6-9. With reference to FIG. 6, a directory containing incompatible Media Files is shown (here, FLAC Audio Files). These files cannot be loaded into the Media Organizer 1400 (here, for purposes of illustration, Apple, Inc.'s ITUNES®). In the next step, referring to FIG. 7, the user opens the Media Files (e.g., the list of Media Files 1000) in the Media Player 1300. This can be done by a commonly accepted procedure well known to those possessing ordinary skill in the art, such as, for example, dragging (indicated by shadowed depiction 1100) the Media Files 1000 to the proxy creation window 1200 which is part of the Media Player 1300.

Figure 8:
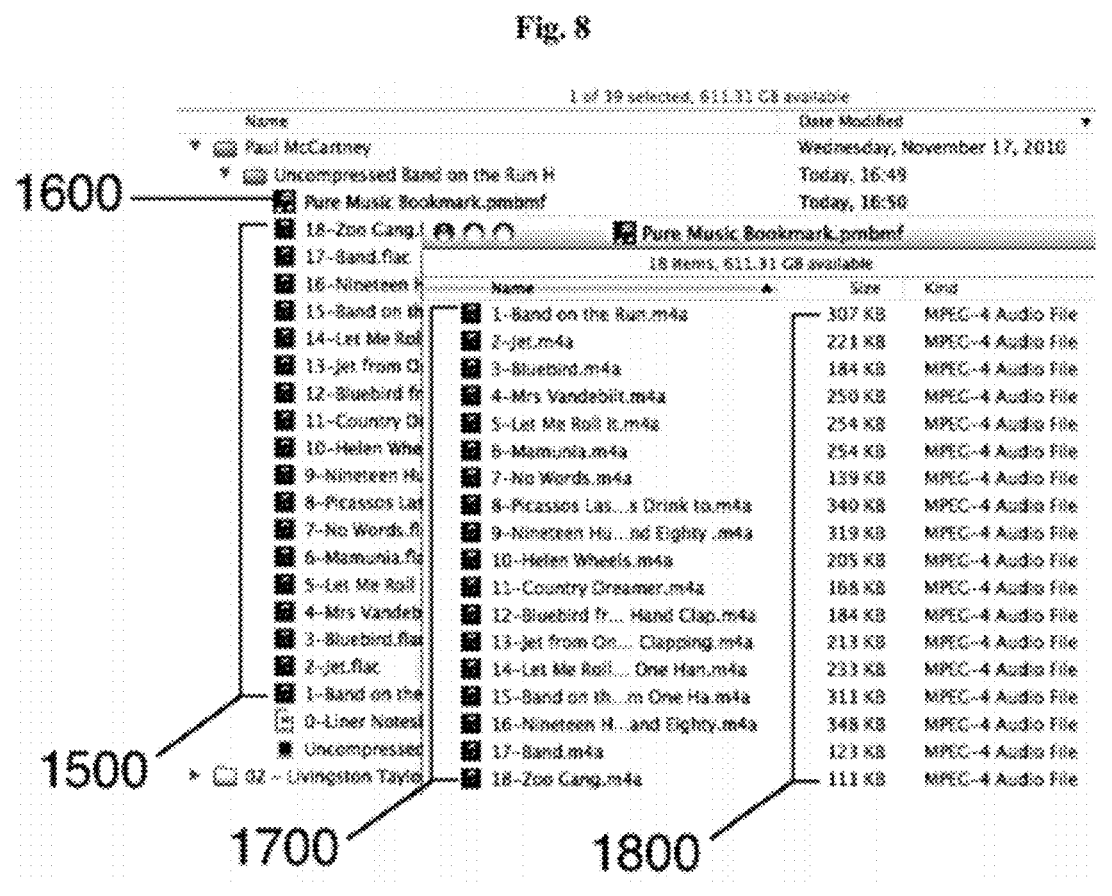

The result of the creation of proxy files is depicted in FIGS. 8 and 9. FIG. 8 shows the parent directory containing the incompatible Media Files 1500. A subdirectory 1600 created by the Media Playback System 10 contains the generated Proxy Files 1700. One having ordinary skill in the art will appreciate that on the Apple® Macintosh computer operating system, the subdirectory may appear as a single, monolithic file or "package," whose contents only can be examined by the user via employing a special command ("Show Package Contents"). This particular feature is well known to many users of the Apple® Macintosh operating system. Important to note is that the Proxy Files are much smaller than their original counterparts, despite being nearly indistinguishable from the originals (aside from incompatibility) by the Media Organizer. For example, Track 1 original size is ca. 113 MB, whereas the proxy version is only ca. 307 kB, more than a factor of 300 smaller. Similar amounts of compression factors are apparent for the other tracks. The large compression factors are a result of having silence of the same duration as the original audio, instead of the original audio itself. Silence compresses very efficiently, as is known to one of ordinary skill in the art.

Finally, as shown in FIG. 9, the generated proxy files are organized and displayed in a "playlist" in the Media Organizer, showing track information including the sample rate of the original high-resolution digital tracks. According to an embodiment of the present invention, the tracks are intended, as much as is practical to accomplish, to be indistinguishable by the user from the original Media Files (or designated tracks pointed to in a single Media File). As would be expected, the displayed "Bit Rate" reflects the highly compressed size of the proxy files, which are silent (containing compressed audio samples having an amplitude value of zero) but otherwise equivalent to the original Media Files (as much as possible or practical) in duration, sample rate and other characteristics.

Although the embodiments of the present invention are describe above in the context of a media file that is incompatible with the media organizer, one having ordinary skill in the art will appreciate that additional embodiments are within the scope of the present invention, including, but not limited to, embodiments wherein the target media file is compatible with the media organizer. In such embodiments, the Media Playback System 10 may be configured to operate as described in detail above, with the associated processing steps including selection of media file that is compatible with the media organizer, but for which playback is desired via the Media Playback System 10.

It is to be understood that the exemplary embodiments are merely illustrative of the invention and that many variations of the above-described embodiments may be devised by one skilled in the art without departing from the scope of the invention. It is therefore intended that all such variations be included within the scope of the following claims and their equivalents.

What is claimed is:

1. A method comprising:

detecting, by a processor, a selection of a proxy file associated with a media file, wherein the selection is communicated via a media organizer, and wherein the proxy file comprises a silent data block comprising a duration and sample rate equal to that of the media file;

polling, by the processor, the media organizer for proxy file information;

locating, by the processor, the media file associated with the proxy file based on the proxy file information; and playing, by the processor, the media file.

2. The method of claim 1 further comprising:

determining the media organizer is playing the proxy file; and directing the media organizer to terminate playback of the proxy file.

3. The method of claim 1, wherein the media file is stored on a user's device.

4. The method of claim 1, wherein the media file is stored on a remote device communicatively connected to a user's device.

5. The method of claim 1 further comprising locating a track of the media file associated with the proxy file.

6. The method of claim 1, wherein the proxy file is in a format compatible with the media organizer.

7. The method of claim 1, wherein the media organizer comprises an ITUNES® library.

8. The method of claim 1, wherein the media file comprises a plurality of tracks comprising a first track and a second track, and wherein a proxy file is associated with each of the plurality of tracks.

9. The method of claim 8 further comprising determining a time offset of the second track relative to the first track.

10. A method comprising:

parsing, by a processor, a media file to identify media file information;

generating, by the processor, a proxy file compatible with a media organizer based on the media file information, wherein the proxy file comprises a silent data block comprising a duration and sample rate equal to that of the media file;

detecting, by the processor, a selection of the proxy file associated with the media file, wherein the selection is communicated via the media organizer;

polling, by the processor, the media organizer for proxy file information;

locating, by the processor, the media file associated with the proxy file based on the proxy file information; and playing, by the processor, the media file.

11. The method of claim 10, wherein the proxy file comprises tag information associated with the media file.

12. The method of claim 10 further comprising identifying the proxy file associated with the user-selected media file.

13. The method of claim 10 further comprising adding the proxy file to a library associated with the media organizer.

14. The method of claim 10, wherein the generating comprises determining one or more of a sample rate, a sample word length, a duration, or tag information.

15. A non-transitory computer readable medium having stored thereon a plurality of instructions, the plurality of instructions including instructions that, when executed by a processor, cause the processor to perform operations comprising:

detecting a selection of a proxy file associated with a media file, wherein the selection is communicated via a media organizer, and wherein the proxy file comprises a silent data block comprising a duration and sample rate equal to that of the media file;

polling the media organizer for proxy file information;

locating the media file associated with the proxy file based on the proxy file information; and playing the media file.

16. A system comprising:

a memory comprising instructions; and a processor coupled to the memory, the processor configured to execute the instructions to:

detect a selection of a proxy file associated with a media file, wherein the selection is communicated via a media organizer, and wherein the proxy file comprises a silent data block comprising a duration and sample rate equal to that of the media file;

poll the media organizer for proxy file information;

locate the media file associated with the proxy file based on the proxy file information; and play the media file.

17. A system comprising:

a memory comprising instructions; and a processor coupled to the memory, the processor configured to execute the instructions to:

parse a media file to identify media file information;

generate a proxy file compatible with a media organizer based on the media file information, wherein the proxy file comprises a silent data block comprising a duration and sample rate equal to that of the media file;

add the proxy file to a storage media associated with the media organizer;

detect a selection of the proxy file associated with the media file, wherein the selection is communicated via the media organizer;

poll the media organizer for proxy file information;

locate the media file associated with the proxy file based on the proxy file information; and play the media file.

* * * * *